United States Patent
Tanabe et al.

(10) Patent No.: US 8,441,461 B2
(45) Date of Patent: May 14, 2013

(54) TOUCH PANEL AND METHOD OF DETECTING PRESS OPERATION POSITION THEREOF

(75) Inventors: Koji Tanabe, Osaka (JP); Kenichi Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 504 days.

(21) Appl. No.: 12/685,143

(22) Filed: Jan. 11, 2010

(65) Prior Publication Data

US 2010/0182276 A1    Jul. 22, 2010

(30) Foreign Application Priority Data

Jan. 19, 2009 (JP) .................................. 2009-008585
May 14, 2009 (JP) .................................. 2009-117469

(51) Int. Cl.
G06F 3/041 (2006.01)

(52) U.S. Cl.
USPC ......................................... 345/174; 345/173

(58) Field of Classification Search ........... 345/173–174
See application file for complete search history.

(56) References Cited

U.S. PATENT DOCUMENTS

| 7,439,466 B2 | 10/2008 | Yamaue et al. | |
| 7,825,905 B2* | 11/2010 | Philipp | 345/173 |
| 2010/0079389 A1* | 4/2010 | Liu et al. | 345/173 |

FOREIGN PATENT DOCUMENTS

| CN | 101339481 | 1/2009 |
| JP | 61-84730 | 4/1986 |
| JP | 61-74137 | 5/1986 |
| JP | 2007-310440 | 11/2007 |

* cited by examiner

Primary Examiner — Alexander Eisen
Assistant Examiner — Robin Mishler
(74) Attorney, Agent, or Firm — Wenderoth, Lind & Ponack, L.L.P.

(57) ABSTRACT

In a touch panel, upper conductive layers on a bottom surface of an upper substrate and lower conductive layers on a top surface of a lower substrate are formed in belt shapes and extend in directions intersecting each other. End portions of the upper conductive layers are connected by an upper resistive layer, and end portions of the lower conductive layers are connected by a lower resistive layer. Then, a voltage is applied between ends of the lower resistive layer and the upper resistive layer sequentially, and voltages at the end portions of the upper resistive layer and the lower resistive layer are detected. Pressed positions can be detected with such a simple configuration.

12 Claims, 8 Drawing Sheets

TOUCH PANEL AND METHOD OF DETECTING PRESS OPERATION POSITION THEREOF

BACKGROUND OF THE INVENTION

1. Field of the Invention

The present invention relates to a touch panel mainly used for operating various kinds of electronic equipments and a method of detecting a press operation position thereon.

2. Background Art

Recently, various kinds of electronic equipments such as a portable telephone and an electronic camera have advanced in functions and become diversified. Along with this, the number of equipments in which a light-transparent touch panel is mounted on the front surface of a liquid crystal display device or the like is increasing. A user operates by pressing a touch panel with a finger thereof, a pen, or the like, while viewing the indication on a display device at the back of the touch panel. According to this operation, various functions of equipment can be switched from one function to another. Such a conventional touch panel is described with reference to FIG. 8. FIG. 8 is a sectional view showing a conventional touch panel. Note here that the drawing is shown in an enlarged size partially so that the configuration can be understood easily.

This touch panel includes film-shaped light-transparent upper substrate 1, light-transparent lower substrate 2 made of glass or the like, frame-shaped spacer 5 disposed on the inner edge of the outer periphery of upper substrate 1 and lower substrate 2 therebetween. Light-transparent upper conductive layer 3 is formed in a substantially rectangular shape on a substantially entire surface of the bottom surface of upper substrate 1. Light-transparent lower conductive layer 4 is formed on a substantially entire surface of the top surface of lower substrate 2. A plurality of dot spacers (not shown) made of insulating resin are formed on the top surface of lower conductive layer 4 with a predetermined interval. A pair of upper electrodes (not shown) are formed on both ends of upper conductive layer 3, and a pair of lower electrodes (not shown) are formed on both ends of lower conductive layer 4 in the direction perpendicular to the upper electrodes.

On the top and bottom surfaces of spacer 5, an adhesive agent (not shown) is coated. Upper substrate 1 and lower substrate 2 are attached together at their outer peripheries with the adhesive agent. Upper conductive layer 3 and lower conductive layer 4 face each other with a predetermined gap therebetween, and thus the touch panel is formed. The thus formed touch panel is disposed on the front surface of a display device and mounted on electronic equipment. The pairs of the top and lower electrodes are electrically connected to an electronic circuit (not shown) of the equipment.

When a user presses a top surface of upper substrate 1 to operate the touch panel by a finger, a pen, or the like in response to an indication on the display device at the back of the touch panel, upper substrate 1 bends downward, causing upper conductive layer 3 at the pressed place to be brought into contact with lower conductive layer 4. The electronic circuit applies a voltage to the upper electrodes and the lower electrodes sequentially. The electronic circuit detects the pressed place by a ratio of the voltages between the respective pair of electrodes, and thereby switches various functions of equipment.

That is to say, a user presses the top surface of upper substrate 1 in a position on a desired menu in a state in which a plurality of menus, or the like, are displayed on the display device at the back of the touch panel. The electronic circuit detects the operated position by a ratio of the voltage between the upper electrodes and the voltage between the lower electrodes, thereby selecting a desired menu from a plurality of menus.

As mentioned above, the pair of upper electrodes are provided on both ends of the substantially rectangular-shaped upper conductive layer 3 provided on the bottom surface of upper substrate 1. The pair of lower electrodes are provided on both ends in the direction perpendicular to the upper electrodes of similarly substantially rectangular-shaped lower conductive layer 4 on the top surface of lower substrate 2. The electronic circuit detects the pressed place by a ratio of the voltages between the respective pair of electrodes. Therefore, the electronic circuit can detect only one pressed position. For example, when a user presses the position shown by arrow A by one finger and simultaneously presses the position shown by arrow B by another finger, the electronic circuit cannot detect these two pressed positions simultaneously.

In order to detect the pressed positions in such a state, for example, a touch panel has been devised in which upper conductive layer 3 and lower conductive layer 4 are formed of a plurality of conductive layers in a substantially belt shape instead of a substantially rectangular shape and they are allowed to cross in the direction perpendicular to each other and to face each other with a predetermined gap therebetween. By applying a voltage to these conductive layers sequentially, a plurality of pressed positions can be detected. In this case, the formation of a touch panel generally needs several to several tens of conductive layers although it depends on the size of a touch panel.

In the case where a plurality of top and lower conductive layers are provided in this way, several tens of top and lower electrodes are required for the connection from respective conductive layers to an electronic circuit. Therefore, the entire outer shape becomes larger. Moreover, since it is necessary to detect a pressed position by sequentially applying a voltage to all of the electrodes, it takes a long time to detect a position. The connection to an electronic circuit and arithmetic processing for detecting a position become complicated.

SUMMARY OF THE INVENTION

The present invention provides a touch panel capable of detecting a plurality of pressed positions and capable of carrying out various operations with a simple configuration, and a method of detecting a press operation position on the touch panel.

The touch panel of the present invention includes a upper substrate, a plurality of belt-shaped upper conductive layers, a upper resistive layer, first and second upper electrodes, a lower substrate, a plurality of belt-shaped lower conductive layers, a lower resistive layer, first and second lower electrodes, and a frame-shaped spacer. The upper conductive layers are formed on the bottom surface of the light-transparent upper substrate. The upper resistive layer connects the upper conductive layers at end portions of the upper conductive layers. The first and second upper electrodes are respectively provided on both ends of the upper resistive layer. The lower conductive layers are formed on the top surface of the light-transparent lower substrate, and face the upper conductive layers with a predetermined gap therebetween, and extend in a second direction intersecting an extending direction of the upper conductive layers. The lower resistive layer connects the lower conductive layers at end portions of the lower conductive layers. The first and second lower electrodes are provided on both ends of the lower resistive layer. The spacer is interposed between the upper substrate and the lower substrate.

In this configuration, a voltage is applied to between the first and second upper electrodes, and a voltage value at the first lower electrode is detected. A voltage is then applied to between the first and second lower electrodes, and a voltage value at the first upper electrode is detected. Based on these voltage values, it is possible to detect a pressed position in the direction in which the upper conductive layers are arranged and in the direction in which the lower conductive layers are arranged, respectively. Furthermore, by detecting a voltage value at the second lower electrode when a voltage is applied between the first and second upper electrodes, and by detecting a voltage value at the second upper electrode when a voltage is applied between the first and second lower electrodes, two pressed positions can be detected.

DETAILED DESCRIPTION OF THE INVENTION

Hereinafter, an embodiment of the present invention is described with reference to drawings. The drawings are shown in an enlarged size partially so that configurations can be understood easily.

Figure 1:
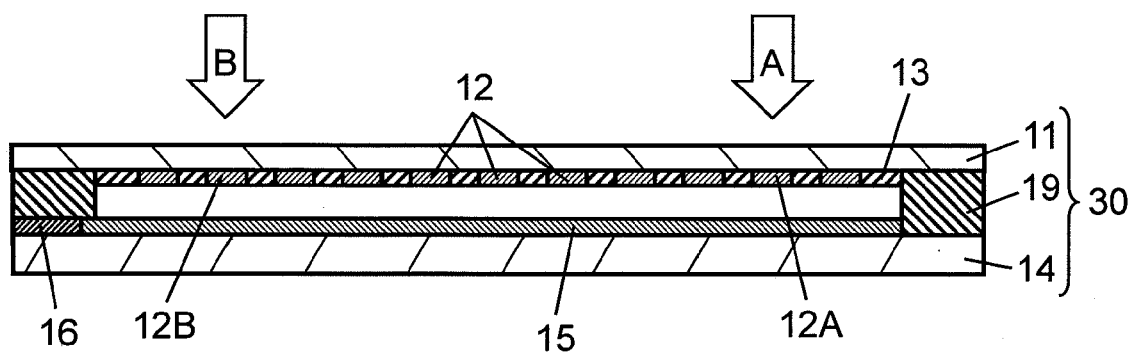
FIG. 1 is a sectional view showing a touch panel in accordance with an embodiment of the present invention.
Figure 2:
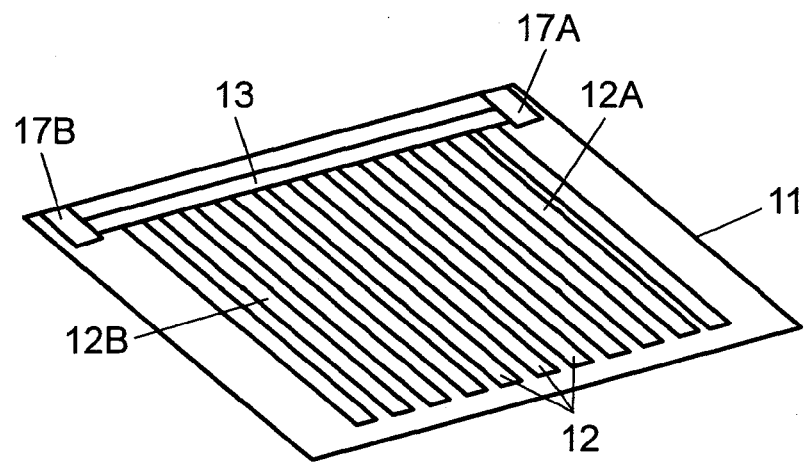
FIG. 2 is an exploded perspective view showing the touch panel shown in FIG. 1.
Figure 2:
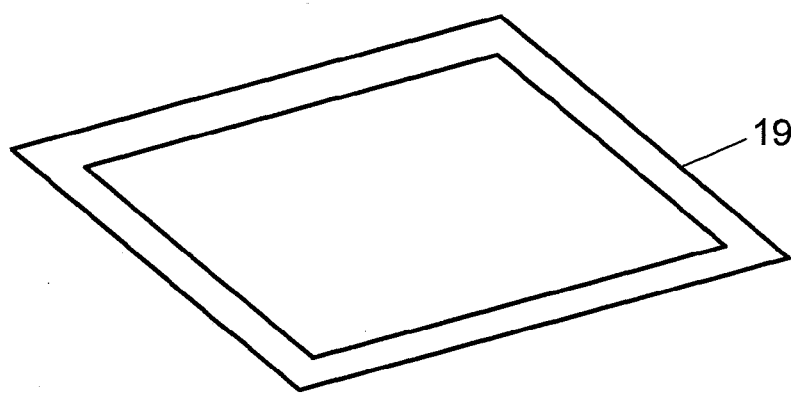
Figure 2:
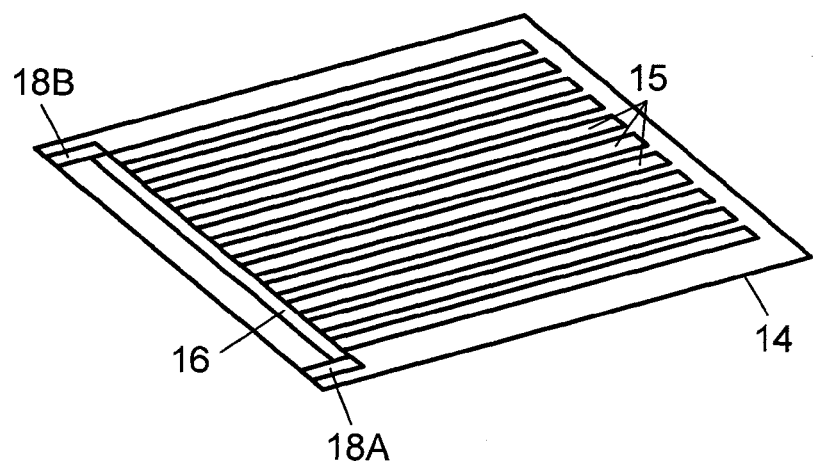
Figure 3:
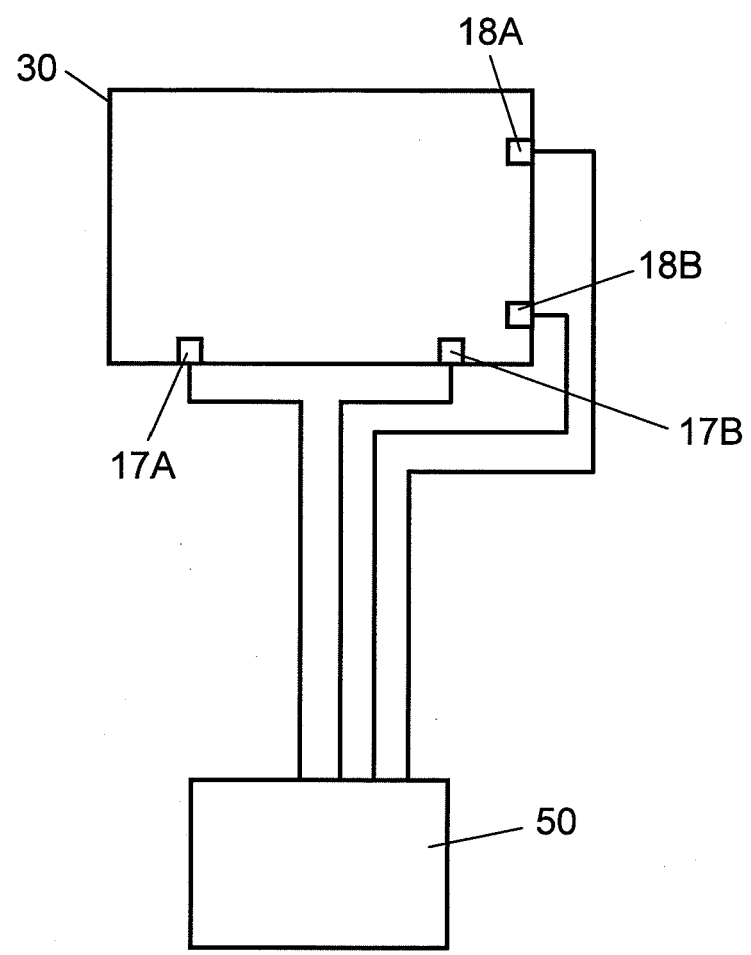
FIG. 3 is a diagram showing a connection between the touch panel shown in FIG. 1 and an electronic circuit.

FIGS. 1 and 2 are a sectional view and an exploded perspective view showing a touch panel in accordance with an embodiment of the present invention. FIG. 3 is a diagram showing a connection between the touch panel and an electronic circuit. Touch panel 30 includes upper substrate 11, a plurality of belt-shaped upper conductive layers 12, upper resistive layer 13, first upper electrode 17A, second upper electrode 17B, lower substrate 14, a plurality of belt-shaped lower conductive layers 15, lower resistive layer 16, first lower electrode 18A, second lower electrode 18B, and spacer 19.

Light-transparent upper substrate 11 is made of polyethylene terephthalate, polyether sulphone, or polycarbonate. Belt-shaped upper conductive layers 12 are formed on the bottom surface of upper substrate 11. Upper conductive layers 12 are made of indium tin oxide, oxide tin, or the like, and formed in the front-rear direction by sputtering or the like. Upper resistive layer 13 made of carbon or the like is connected to the rear end portion of each upper conductive layer 12. That is to say, upper resistive layer 13 connects upper conductive layers 12 at end portions of upper conductive layers 12. Upper electrodes 17A and 17B are made of silver, carbon, or the like, and formed on both ends of upper resistive layer 13.

Light-transparent lower substrate 14 is made of glass, acrylic, polycarbonate, or the like. Belt-shaped lower conductive layers 15 are formed on the top surface of lower substrate 14. Belt-shaped lower conductive layers 15 are made of indium tin oxide, tin oxide, or the like, and formed in the right-left direction by sputtering or the like. Thus, lower conductive layers 15 face upper conductive layers 12 with a predetermined gap therebetween and extend in the direction perpendicular to the direction in which upper conductive layers 12 extend. Lower resistive layer 16 made of, for example, carbon is connected to the left end portions of lower conductive layers 15. That is to say, lower resistive layer 16 connects lower conductive layers 15 at the end portions of lower conductive layers 15. Dot spacers (not shown) made of insulating resin such as epoxy resin and silicone resin are formed on the top surface of lower substrate 14 with a predetermined interval. Lower electrodes 18A and 18B are made of silver, carbon, or the like, and formed on both ends of lower resistive layer 16.

Frame-shaped spacer 19 is made of polyester, epoxy resin, non-woven fabric, or the like, and formed on the inner edge of the outer periphery between upper substrate 11 and lower substrate 14. That is to say, spacer 19 is interposed between upper substrate 11 and lower substrate 14. An adhesive agent (not shown) such as acrylic agent or rubber agent is coated on either or both of the top and bottom surfaces of spacer 19. With this adhesive agent, upper substrate 11 and lower substrate 14 are attached to each other at their outer peripheries such that upper conductive layer 12 faces lower conductive layer 15 with a predetermined gap therebetween.

The thus formed touch panel 30 is disposed on the front surface of, for example, a liquid crystal display device and is mounted on electronic equipment. Then, as shown in FIG. 3, upper electrodes 17A and 17B, and lower electrodes 18A and 18B are electrically connected to electronic circuit 50 of the electronic equipment.

Figure 4A:
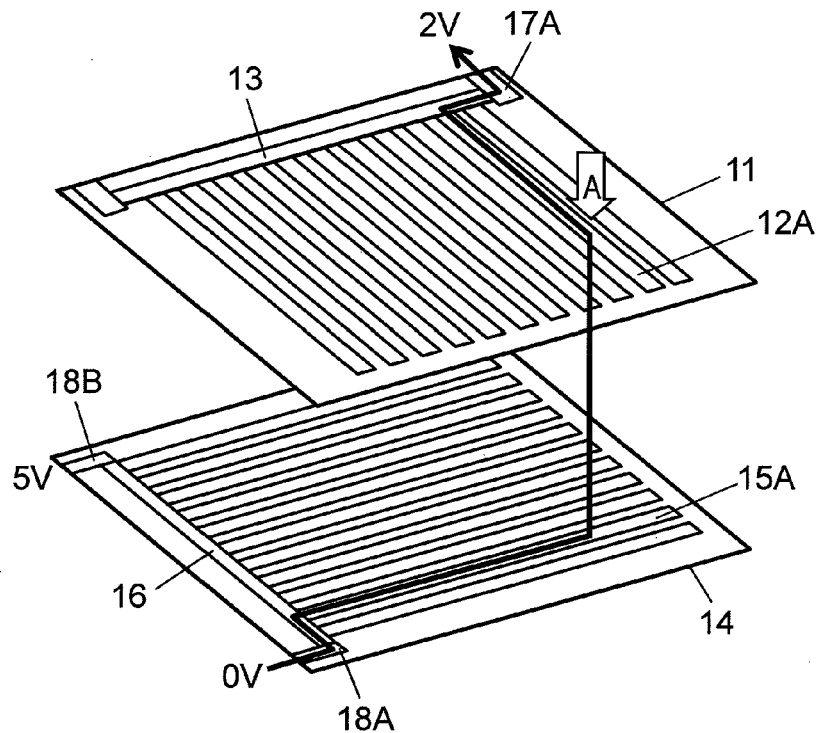
FIGS. 4A and 4B are views for illustrating a principle of detection of a pressed position on the touch panel shown in FIG. 2.

Next, a principle of detection of a pressed operation position and pressed operation positions on touch panel 30 is described with reference to FIGS. 4A to 7B. FIGS. 4A, 4B, 6A to 7B are views for illustrating a principle of detection of a pressed position or pressed operation positions on the touch panel shown in FIG. 2. FIGS. 5A and 5B are plan views showing a state in which the touch panel shown in FIG. 1 is mounted on a display device.

A user operates by pressing a place on the top surface of upper substrate 11, for example, a place shown by arrow A, by a finger, a pen, or the like, in response to the indication on the display device disposed at the back of touch panel 30. In this case, upper substrate 11 bends downward, and one of upper conductive layers 12 at the pressed place is brought into contact with any of lower conductive layers 15 on the top surface of lower substrate 14. For example, as shown in FIG. 4A, upper conductive layer 12A is brought into contact with lower conductive layer 15A.

Electronic circuit 50 applies a voltage between lower electrodes 18A and 18B. For example, electric circuit 50 applies a voltage of 5 V between lower electrodes 18A and 18B. In this state, a voltage corresponding to voltage drop generated in the portion from lower electrode 18A to lower conductive layer 15A in lower resistive layer 16 is detected at upper electrode 17A. For example, a voltage of 2 V is detected from upper electrode 17A. Based on the voltage, electric circuit 50 detects a press operation position of arrow A in the front-rear direction.

Figure 4B:
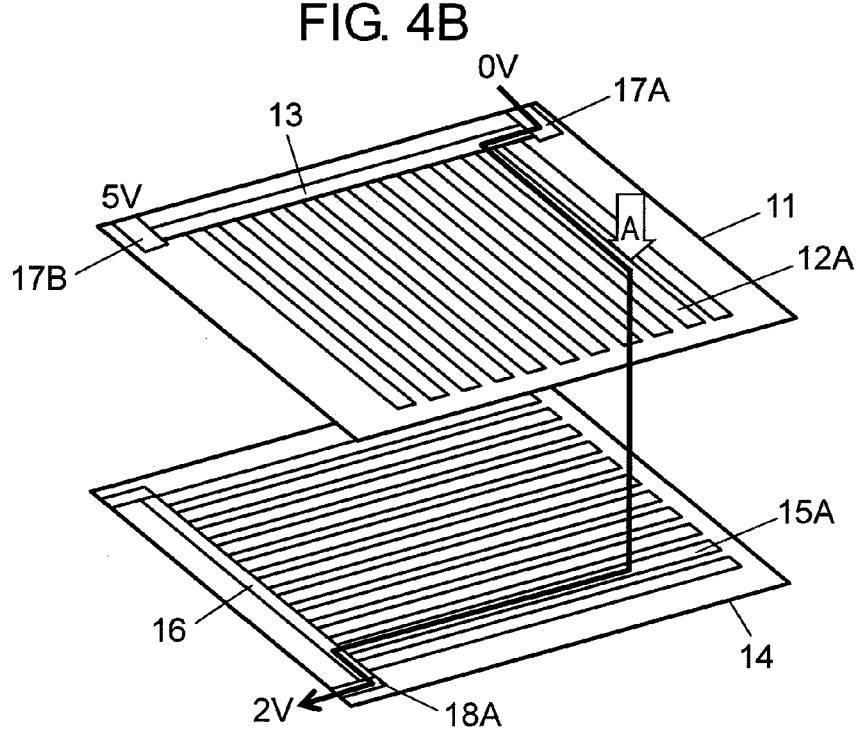
Figure 5A:
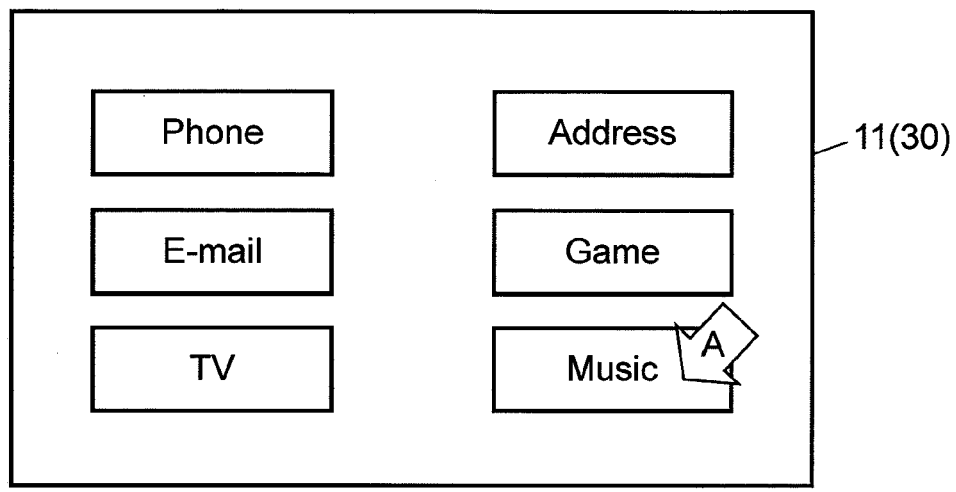
FIGS. 5A and 5B are plan views showing a state in which the touch panel shown in FIG. 1 is mounted on a display device.
Figure 5B:
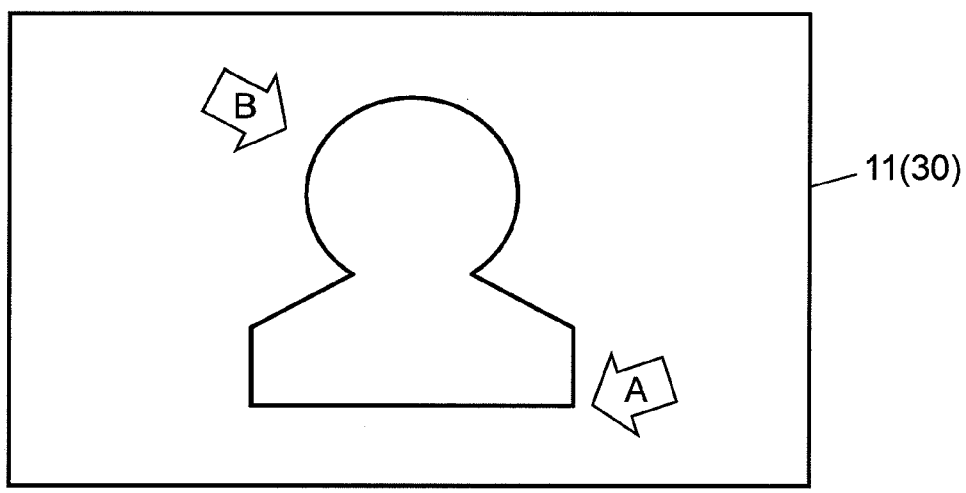

As shown in FIG. 4B, electronic circuit 50 then switches electrodes to which a voltage is to be applied, and applies a voltage between upper electrodes 17A and 17B. Also in this case, electric circuit 50 applies a voltage of 5 V between upper electrode 17A and upper electrode 17B. In this state, a voltage corresponding to voltage drop generated in the portion from upper electrode 17A to upper conductive layer 12A in upper resistive layer 13 is detected at upper electrode 18A. For example, a voltage of 2 V is detected from lower electrode 18A. Based on the voltage, electric circuit 50 detects a press operation position of arrow A in the right-left direction.

That is to say, as shown in FIG. 5A, in a state in which a plurality of menus are displayed on a display device at the back of touch panel 30, a user presses the top surface of upper substrate 11 on a desired menu. For example, when the user presses a place shown by arrow A, electronic circuit 50 applies a voltage to lower electrodes 18A and 18B and upper electrodes 17A and 17B sequentially. Then, electronic circuit 50 detects a pressed position in the front-rear direction based on the voltage detected at upper electrode 17A and then detects a pressed position in the right-left direction based on the voltage detected at lower electrode 18A. According to these detections, electronic circuit 50 selects a desired menu from the plurality of menus.

Furthermore, as shown in FIG. 5B, in a state in which, for example, a photograph or a map is displayed on a display device at the back of touch panel 30, a user presses, for example, a place shown by arrow A in the lower right part. Also in this case, similar to the above-mentioned case, electronic circuit 50 detects the pressed position shown by arrow A. At this time, when the user presses a place shown by arrow B in the upper left part by another finger simultaneously while pressing the place shown by arrow A, the position shown by arrow B of upper substrate 11 also bends downward.

Figure 6A:
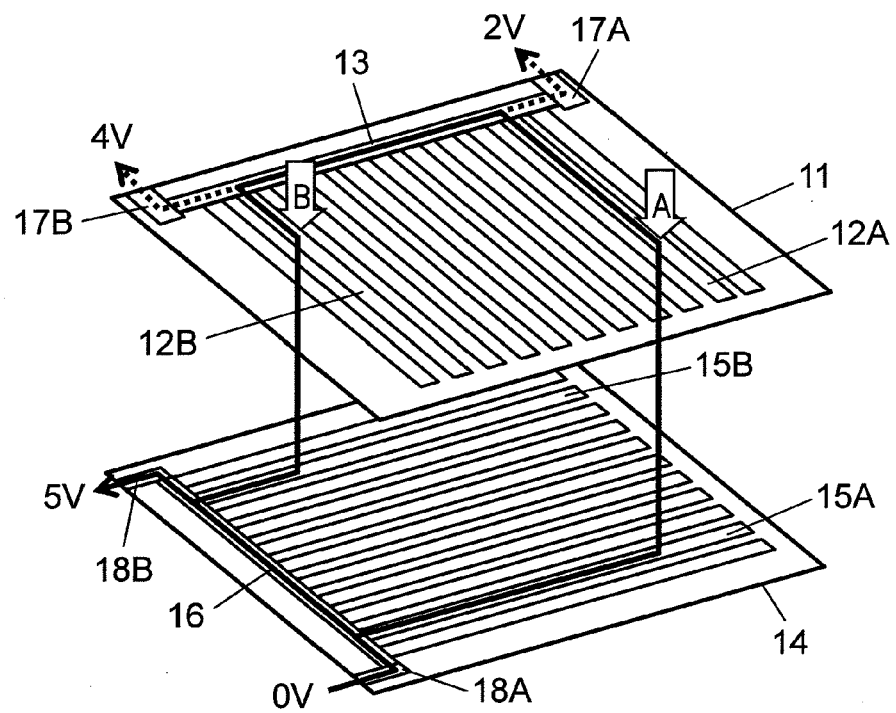
FIGS. 6A, 6B, 7A, and 7B are views for illustrating a principle of detection of pressed positions on the touch panel shown in FIG. 2.

In this case, for example, as shown in FIG. 6A, upper conductive layer 12A is brought into contact with lower conductive layer 15A in a place shown by arrow A in the lower right part, and upper conductive layer 12B is brought into contact with lower conductive layer 15B in a place shown by arrow B in the upper left part.

At this time, electronic circuit 50 applies a voltage between lower electrodes 18A and 18B. For example, electric circuit 50 applies a voltage of 5 V to between lower electrodes 18A and 18B. In this case, for example, a voltage of 2 V is detected from upper electrode 17A. Based on the voltage value, electric circuit 50 detects a pressed position of arrow A in the front-rear direction. At the same time, a voltage of, for example, 4V is detected from upper electrode 17B. Therefore, based on the voltage value, electronic circuit 50 detects the pressed position of arrow B in the front-rear direction. That is to say, electronic circuit 50 detects the pressed position of arrow A in the direction in which lower conductive layers 15 are arranged based on the voltage value detected from upper electrode 17A, and detects the pressed position of arrow B in the direction in which lower conductive layers 15 are arranged based on the voltage value detected from upper electrode 17B.

Figure 6B:
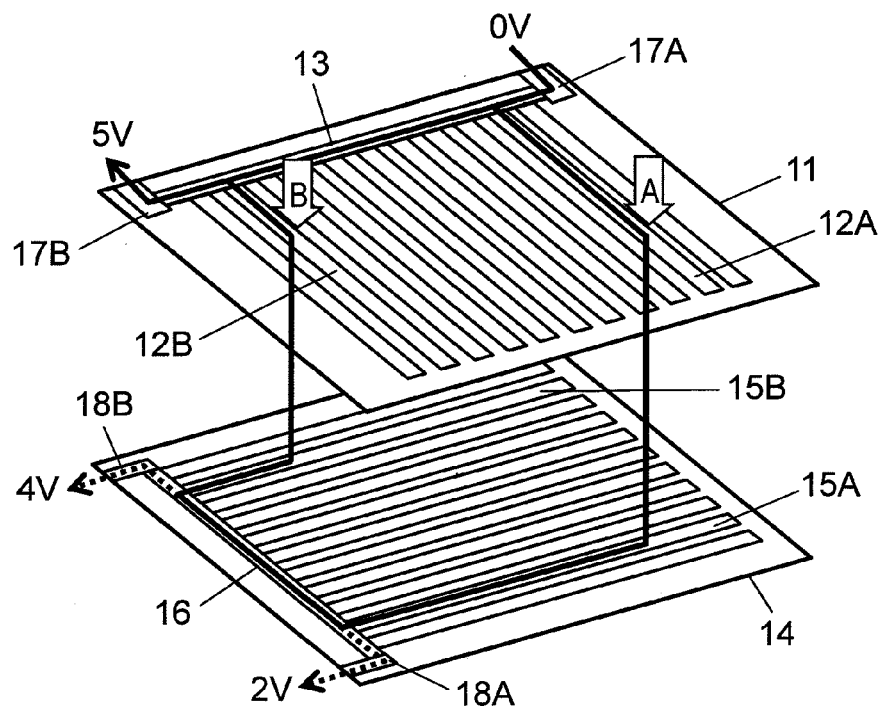

Furthermore, electronic circuit 50 then switches electrodes to which a voltage is to be applied, and applies a voltage of, for example, 5 V between upper electrode 17A and upper electrode 17B as shown in FIG. 6B. In this case, for example, a voltage of 2 V is detected from lower electrode 18A, and a voltage of 4 V is detected from lower electrode 18B. Therefore, based on the voltages, electronic circuit 50 detects pressed positions of arrows A and B in the right-left direction. That is to say, electronic circuit 50 detects a pressed position of arrow A in the direction in which upper conductive layers 12 are arranged based on the voltage value detected from lower electrode 18A, and detects a pressed position of arrow B in the direction in which upper conductive layers 12 are arranged based on the voltage value detected from lower electrode 18B.

As described above, electronic circuit 50 applies a voltage lower electrodes 18A and 18B and upper electrodes 17A and 17B, sequentially. Then, electronic circuit 50 detects the pressed positions of arrows A and B in the front-rear direction based on voltages of upper electrode 17A and upper electrode 17B, respectively, and detects the pressed positions in the right-left direction based on a voltage detected from lower electrodes 18A and 18B, respectively. Thus, electronic circuit 50 detects two pressed positions.

Furthermore, as shown in FIG. 5B, the user moves two fingers outward or inward on the diagonal line while pressing places in the lower right part and in the upper left part of a photograph, map, or the like. In this case, similar to the above-mentioned case, electronic circuit 50 detects the movement of the two pressed positions shown by arrows A and B. Based on these detections, electronic circuit 50 zooms in and out the display of, for example, a photograph or a map on the display device. Such various operations are carried out.

In this way, upper conductive layers 12 and lower conductive layers 15 are formed in a belt shape such that they extend in directions perpendicular to each other. Then, the end portions of upper conductive layers 12 and the end portions of lower conductive layers 15 are connected by upper resistive layer 13 and lower resistive layer 16, respectively. According to this configuration, only by detecting voltages at four electrodes, that is, upper electrodes 17A and 17B and lower electrodes 18A and 18B which are provided on both ends of upper resistive layer 13 and lower resistive layer 16, two pressed positions can be detected.

Therefore, the connection between electronic circuit 50 and touch panel 30 and arithmetic processing for detection of positions in electronic circuit 50 are also simplified. Furthermore, as mentioned above, by detecting the change of a plurality of the pressed positions, it is possible to carry out various operations including not only a simple selection of menu, or the like, but also zooming in and out of a screen displayed on a display device.

Note here that when two places are pressed, a resistance value of each part of upper resistive layer 13, a resistance value of each part of lower resistive layer 16, and a voltage from each electrode have the following relation. For example, in FIG. 6A, a resistance value of resistive layer 16 between lower electrode 18A and lower conductive layer 15A is defined as $R_{LA}$. A resistance value of resistive layer 16 between lower conductive layer 15B and lower electrode 18B is defined as $R_{LB}$. A resistance value of resistive layer 16 between lower conductive layers 15A and 15B is defined as $R_{LAB}$. A resistance value of upper resistive layer 13 between upper conductive layers 12A and 12B is defined as $R_{UAB}$. In those definitions, a voltage output from upper electrode 17A is a value obtained by multiplying a voltage applied between lower electrodes 18A and 18B by $R_{LA}\{R_{LA}+R_{LB}+1/(1/R_{LAB}+1/R_{UAB})\}$. This is because two places are pressed, so that resistance value $R_{UAB}$ of upper resistive layer 13 between upper conductive layers 12A and 12B is connected in parallel to resistance value $R_{LAB}$ of lower resistive layer 16 between upper conductive layers 12A and 12B. Furthermore, a voltage output from upper electrode 17B is a value obtained by multiplying a voltage applied between lower electrodes 18A and 18B by $\{R_{LA}+1/(1/R_{LAB}+1/R_{UAB})\}/\{R_{LA}+R_{LB}+1/(1/R_{LAB}+1/R_{UAB})\}$.

Similarly, as shown in FIG. 6B, a resistance value of upper resistive layer 13 between upper electrode 17A and upper conductive layer 12A is defined as $R_{UA}$. A resistance value of upper resistive layer 13 between upper conductive layer 12B and upper electrode 17B is defined as $R_{UB}$. In those definitions, a voltage output from lower electrode 18A is a value obtained by multiplying a voltage applied between upper electrodes 17A and 17B by $R_{UA}/\{R_{UA}+R_{UB}+1/(1/R_{LAB}+1/R_{UAB})\}$. Furthermore, a voltage output from lower electrode 18B is a value obtained by multiplying a voltage applied between upper electrodes 17A and 17B by $\{R_{UA}+1/(1/R_{LAB}+1/R_{UAB})\}/\{R_{UA}+R_{UB}+1/(1/R_{LAB}+1/R_{UAB})\}$.

In this way, according to the voltages respectively applied to between upper electrodes 17A and 17B and between lower electrodes 18A and 18B, the number of belt-shaped upper conductive layers 12 and lower conductive layers 15, and the pressed positions, voltages are output to upper electrodes 17A and 17B and lower electrodes 18A and 18B. In this case, it is enough that upper resistive layer 13 and lower resistive layer 16 are formed in such a way in which the length is proportional to the resistance value. That is to say, a complicated configuration in which specific resistance of the resistive layers is changed according to the number of conductive layers is not needed. A plurality of pressed positions can be detected with such a simple configuration.

Figure 7A:
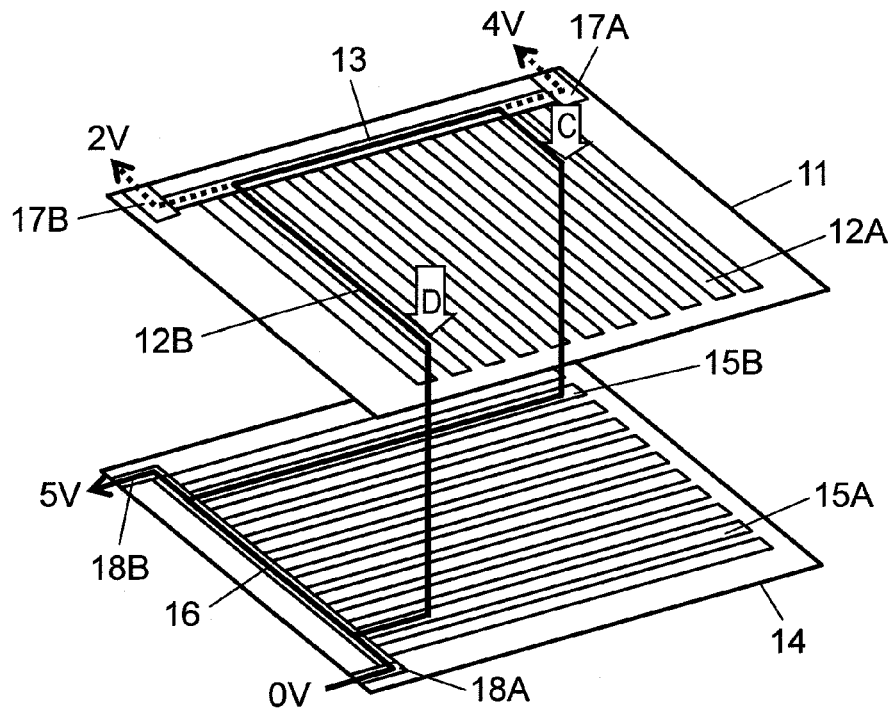

On the contrary to the above-mentioned case, as shown in FIG. 7A, for example, a user may presses places shown by arrow C in the upper right part and shown by arrow D in the lower left part simultaneously. In this case, in the place shown by arrow C, upper conductive layer 12A is brought into contact with lower conductive layer 15B, and in the place shown by arrow D, upper conductive layer 12B is brought into contact with lower conductive layer 15A.

Then, electronic circuit 50 applies a voltage of 5V between lower electrodes 18A and 18B. In this case, a voltage of, for example, 4V is detected from upper electrode 17A, and a voltage of, for example, 2V is detected from upper electrode 17B. Based on these voltage values, electronic circuit 50 detects pressed positions of arrow C and arrow D in the front-rear direction.

Figure 7B:
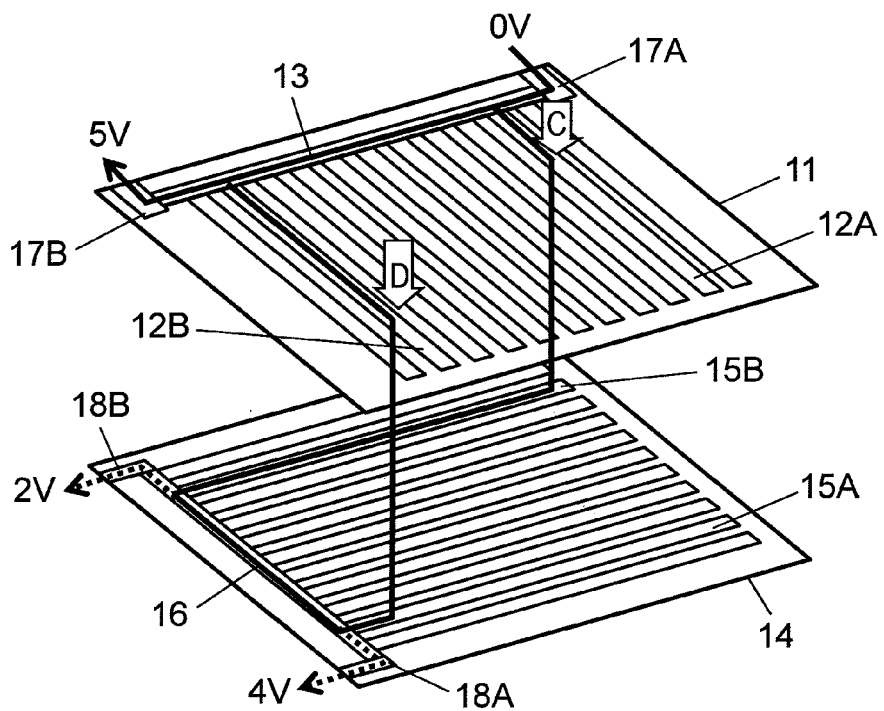
Figure 8:
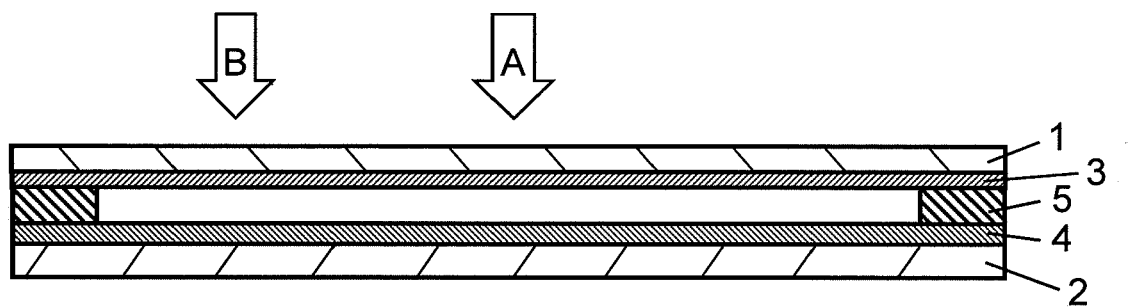
FIG. 8 is a sectional view showing a conventional touch panel.

Furthermore, as shown in FIG. 7B, electronic circuit 50 applies a voltage of 5 V between upper electrodes 17A and 17B. In this case, for example, a voltage of 4V is detected from lower electrode 18A, and a voltage of 2V is detected from lower electrode 18B. Based on the voltage values, electronic circuit 50 detects pressed positions of arrows C and D in the right-left direction.

That is to say, when places shown by arrows C and D located symmetric to arrows A and B are pressed, voltage values contrary to those in the case of arrows A and B mentioned above are detected from each electrode. Electronic circuit 50 can detect pressed positions correctly when such a pressing operation is carried out.

Thus, in touch panel 30, upper conductive layers 12 on the bottom surface of upper substrate 11 and lower conductive layers 15 on the top surface of lower substrate 14 are formed in a belt shape such that they extend in directions perpendicular to each other. Then, the end portions of upper conductive layers 12 and the end portions of lower conductive layers 15 are connected by upper resistive layer 13 and lower resistive layer 16, respectively. According to this configuration, by applying a voltage to both ends of upper resistive layer 13 and lower resistive layer 16 sequentially and detecting voltages at both ends of lower resistive layer 16 and upper resistive layer 13, two pressed positions can be detected. Moreover, the number of electrodes 17A, 17B, 18A, and 18B can be as small as four. Therefore, the connection to electronic circuit 50 and arithmetic processing for detection of positions are also simplified. Touch panel 30 can operate various operations with such a simple configuration.

Note that upper conductive layers 12 do not have to extend perpendicular to the extending direction of lower conductive layers 15. The angle of the extending directions may be shifted from the right angle. That is to say, the extending direction of upper conductive layers 12 may not be parallel with that of lower conductive layers 15, and it is enough that the extending direction of upper conductive layers 12 intersects that of lower conductive layers 15.

As mentioned above, by using a touch panel having a simple configuration of the present invention, two pressed positions can be detected, and various operations can be carried out. This touch panel is useful mainly for operating various electronic equipments.

What is claimed is:

1. A method of detecting a press operation position on a upper substrate of a touch panel, the method comprising:
   (A) providing a touch panel which includes
       a light-transparent upper substrate,
       a plurality of belt-shaped upper conductive layers formed on a bottom surface of the upper substrate,
       an upper resistive layer connecting the upper conductive layers at end portions of the upper conductive layers,
       first and second upper electrodes respectively provided on ends of the upper resistive layer,
       a light-transparent lower substrate,
       a plurality of belt-shaped lower conductive layers formed on a top surface of the lower substrate, the lower conductive layers facing the upper conductive layers with a predetermined gap therebetween,
       a lower resistive layer connecting the lower conductive layers at end portions of the lower conductive layers, and
       first and second lower electrodes respectively provided on ends of the lower resistive layer,
       wherein the upper resistive layer extends in a first direction from a first side of the touch panel to a second side of the touch panel, and the first and second upper electrodes are disposed on distal ends of the upper resistive layer, the distal ends being opposite to each other in the first direction,
       wherein the lower resistive layer extends in a second direction from a third side of the touch panel to a fourth side of the touch panel, and the first and second lower electrodes are disposed on distal ends of the lower resistive layer, the distal ends being opposite each other in the second direction;
   (B) causing the belt-shaped upper conductive layers and the belt-shaped lower conductive layers to contact each other at a first position and a second position by pressing the upper substrate at the first position and the second position;
   (C) while the belt-shaped upper conductive layers and the belt-shaped lower conductive layers are contacting each other at the first position and the second position, applying a voltage to the ends of the lower resistive layer and measuring a voltage value at the first upper electrode and a voltage value at the second upper electrode;
   (D) while the belt-shaped upper conductive layers and the belt-shaped lower conductive layers are contacting each other at the first position and the second position, applying a voltage to the ends of the upper resistive layer and measuring a voltage value at the first lower electrode and a voltage value the second lower electrode;

(E) detecting a location of the first position in the second direction based on the voltage value at the first upper electrode measured in (C);
(F) detecting a location of the second position in the second direction based on the voltage value at the second upper electrode measured in (C);
(G) detecting a location of the first position in the first direction based on the voltage value at the first lower electrode measured in (D);
(H) detecting a location of the second position in the first direction based on the voltage value at the second lower electrode measured in (D); and
(I) determining a location of the first position and the second position based on a result of (E), (F), (G), and (H).

2. The method of claim 1, wherein a frame-shaped spacer is interposed between the upper substrate and the lower substrate.

3. The method of claim 1, wherein the belt-shaped upper conductive layers extend in a direction perpendicular to the first direction, and the belt-shaped lower conductive layers extend in a direction parallel to the first direction.

4. The method of claim 1, wherein the upper resistive layer conducts electricity between the first and second upper electrodes, and
wherein the lower resistive layer conducts electricity between the first and second lower electrodes.

5. The method of claim 1, wherein the first and second upper electrodes are directly connected to the upper resistive layer, and
wherein the first and second lower electrodes are directly connected to the lower resistive layer.

6. The method of claim 1, wherein the upper resistive layer and the lower resistive layer are made of a material that causes a voltage drop.

7. The method of claim 1, wherein a pressed position is detected using a voltage drop across the upper resistive layer.

8. The method of claim 1, wherein the belt-shaped upper conductive layers are configured such that two of the belt-shaped upper conductive layers can be pressed simultaneously to make an electrical connection with at least one of the lower conductive layers, and
wherein a pressed position of each of the two belt-shaped upper conductive layers is detected using a voltage drop across the upper resistive layer.

9. The method of claim 1, wherein the lower conductive layers are spaced apart in the second direction, and
wherein the upper conductive layers are spaced apart in the first direction.

10. The method of claim 9, wherein the upper conductive layers are elongated in the second direction and substantially perpendicular to the upper resistive layer, and
wherein the lower conductive layers are elongated in the first direction and substantially perpendicular to the lower resistive layer.

11. The method of claim 10, wherein each of the detecting operations (E), (F), (G), and (H) is performed using a voltage drop across one of the upper resistive layer and the lower resistive layer.

12. The method of claim 1, wherein each of the detecting operations (E), (F), (G), and (H) is performed using a voltage drop across one of the upper resistive layer and the lower resistive layer.

* * * * *